Oct. 21, 1941.  L. H. BLOOD  2,260,098
ARBOR SUPPORT AND HARNESS STRUCTURE
Filed Sept. 19, 1940  2 Sheets-Sheet 1
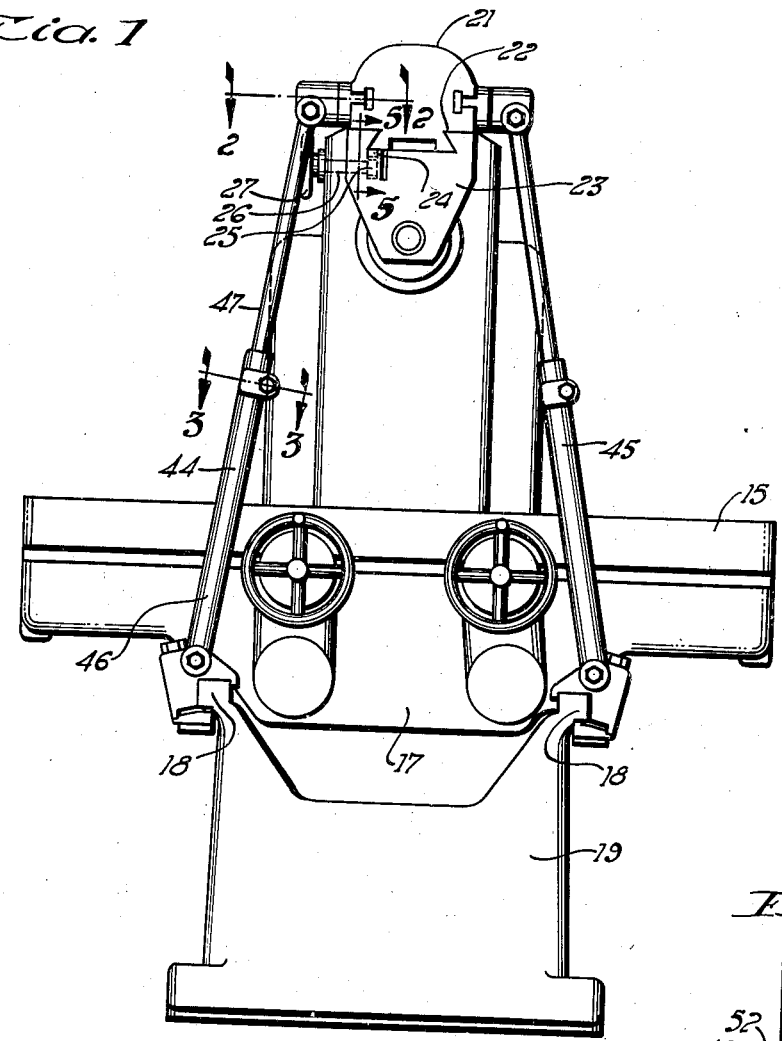
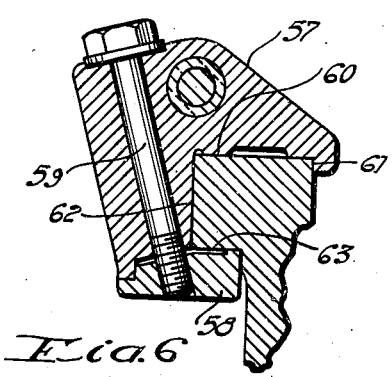
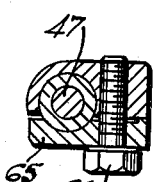
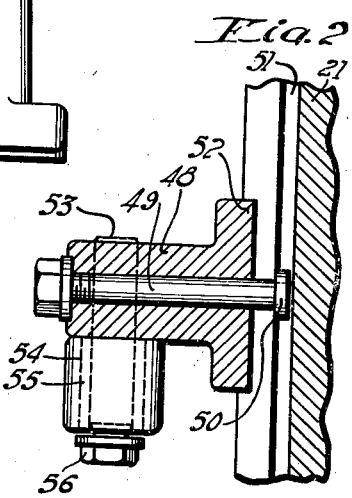
INVENTOR.
LOUIS H. BLOOD
BY
A H Parsons
ATTORNEY.

Oct. 21, 1941.                  L. H. BLOOD                   2,260,098
                    ARBOR SUPPORT AND HARNESS STRUCTURE
                         Filed Sept. 19, 1940           2 Sheets-Sheet 2
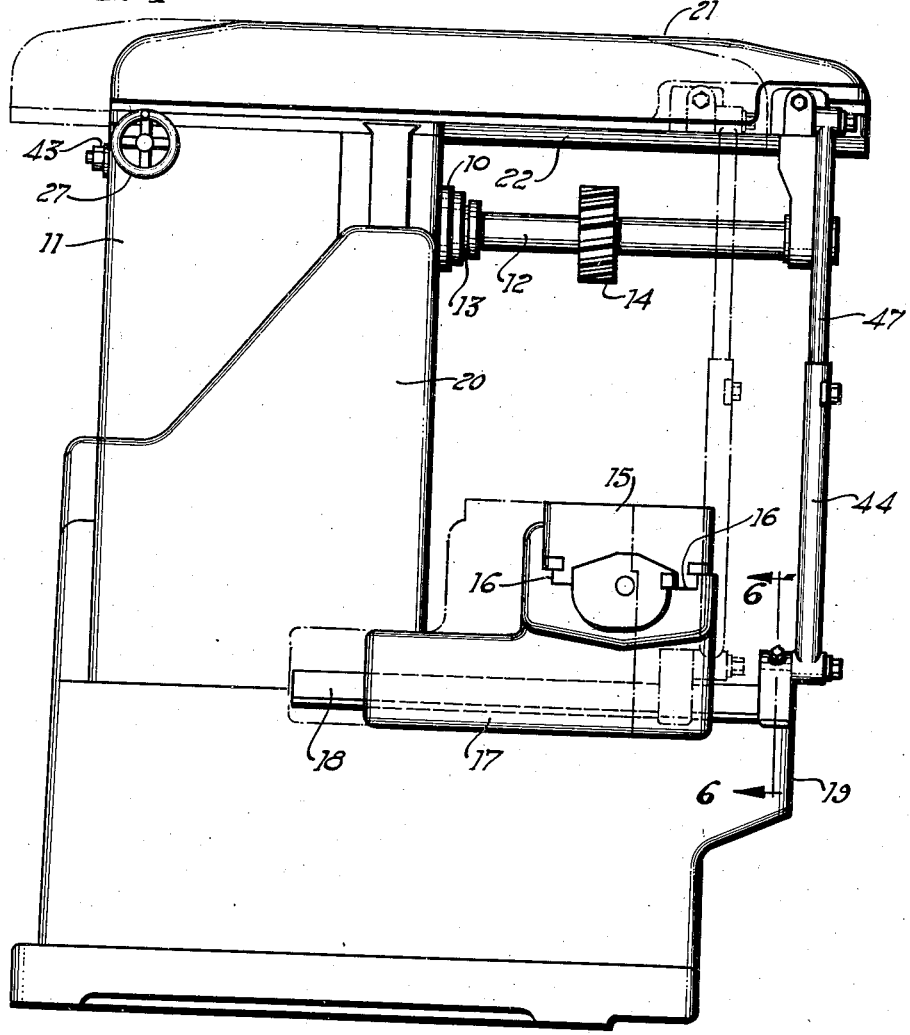
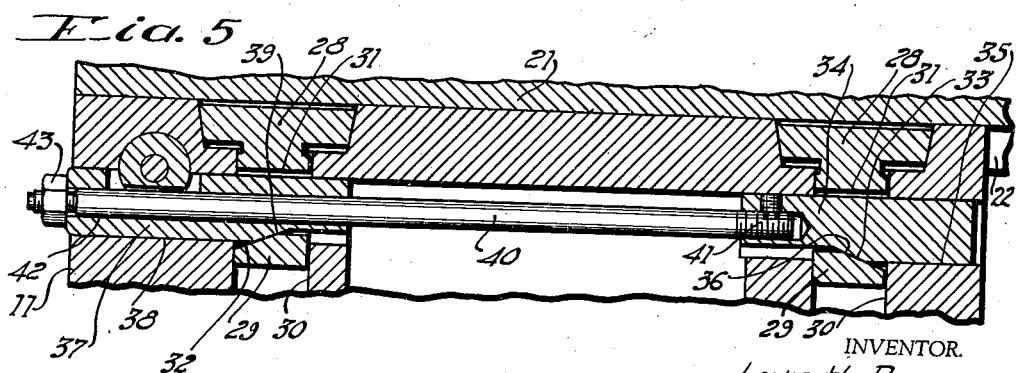
INVENTOR.
Louis H. Blood
BY
  A. H. Parsons
            ATTORNEY.

Patented Oct. 21, 1941

2,260,098

UNITED STATES PATENT OFFICE 2,260,098

ARBOR SUPPORT AND HARNESS STRUCTURE

Louis H. Blood, Covington, Ky., assignor to The Cincinnati Milling Machine Co., Cincinnati, Ohio, a corporation of Ohio Application September 19, 1940, Serial No. 357,452

7 Claims. (Cl. 90—20.5)

This invention relates to milling machines and more particularly to improvements in the cutter supporting structure thereof.

One of the objects of this invention is to provide improved means for bracing the cutter arbor of a milling machine.

Another object of this invention is to provide means for supporting the outboard end of a cutter arbor of a milling machine which is adjustable to shorten the unsupported length of the cutter arbor in accordance with shifting of the table toward the cutter spindle support.

A further object of this invention is to provide an improved harness structure for milling machines.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a milling machine embodying the principles of this invention.

Figure 2 is a detail section on the line 2—2 of Figure 1.

Figure 3 is a detailed section on the line 3—3 of Figure 1.

Figure 4 is a side elevation of the machine shown in Figure 1 as viewed from the left side thereof.

Figure 5 is a longitudinal section through the overarm clamping mechanism as viewed on the line 5—5 of Figure 1.

Figure 6 is a detailed section on the line 6—6 of Figure 4.

Referring to the drawings and more particularly to Figures 1 and 4, there is shown a milling machine having a cutter spindle 10 which is suitably journaled for rotation in the cutter spindle support 11.

This spindle is adapted to be power driven through a transmission not shown. A cutter arbor 12 is adapted to have one end 13 operatively connected to the spindle for power rotation of a milling cutter 14 keyed to the arbor.

The reference numeral 15 indicates a work supporting table which is slidably mounted on guideways 16 formed in a saddle 17, the guideways directing movement of the table transversely to the axis of the cutter arbor 12.

The saddle is slidably mounted on guideways 18 formed on the saddle support 19 whereby the position of the table may be laterally adjusted in a direction parallel to the axis of the cutter arbor 12. In cases where the work does not overhang the sides of the table, the table 15 may be adjusted toward the column 20 and thus make it possible to position the cutter 14 on the arbor 12 a minimum distance from the face of the column.

Although it has been possible in the past to make adjustments on milling machines to obtain minimum distances of cutter location with respect to the front of the column, it has not been possible to follow up this advantage of shortening the unsupported length of the cutter arbor. In other words, although the cutter can be variously positioned on the cutter arbor and close to the face of the column, the unsupported length of the cutter arbor has remained substantially constant. By means of this invention a supporting structure for the outboard end of the cutter arbor has been provided which is adapted to follow up any advantage gained by shifting the table toward the column.

This supporting structure includes an overarm 21, which, as shown in Figure 1, has a dovetailed guide 22 formed on the underside thereof which interfits with corresponding guide surfaces formed in the spindle support 11 and also with corresponding surfaces formed on the arbor support 23. Thus, the arbor support may be adjusted relative to the overarm and the overarm may be longitudinally adjusted relative to the spindle support 11.

The usual mechanical means may be provided for adjusting the overarm comprising a rack 24 attached to the overarm 21, and a cooperating pinion 25 secured to the end of a shaft 26 which is journaled in the support 11. A hand wheel 27 may be utilized for rotating the shaft and pinion to effect adjustment of the overarm. A clamping mechanism, Figure 5, is utilized for clamping the overarm to the support, and comprises a pair of clamping shoes 28 which have bevel surfaces engageable with one of the dove-tailed guide surfaces on the overarm. These shoes have elongated shanks 29 which slide in openings 30 formed in the support 11. Each shank has a crosswise extending hole 31, the bottom of which is provided with oppositely tapered surfaces 32 and 33. A clamping member 34 is slidably mounted in a bore 35 formed in the support 11 and provided with a tapered surface 36 for cooperating with the tapered surface 33 of the forward clamping shoe, whereby longitudinal movement of the clamping member will exert a clamping pressure of the shoe on the overarm 21. A second clamping member 37 is slidably mounted on a bore 38 formed in the support 11 and passing through the bore 31 of the clamping shoe and this clamping member has a beveled surface 39 for exerting a clamping pressure on the other shoe.

A rod 40 is threadedly connected at 41 to the clamping member 34 and extends freely through a bore 42 formed in the clamping member 37. An operating nut 43 is threaded on the end of the rod in engagement with one end of the clamping member 37 whereby rotation of the nut in one direction will draw the clamping members 37 and 34 toward one another, exerting a downward pressure on both of the clamping shoes whereby the overarm will be clamped to the support 11. Rotation of the nut 43 in the opposite direction will release the clamping pressure.

The harness structure which serves to brace the overarm against lateral movement comprises a pair of telescoping braces 44 and 45. Since the construction of both braces is the same except that they are of opposite hand the construction of only one of them will be described.

Referring to Figure 1, the brace consists of a lower tubular member 46 and an upper member 47 which is adapted to slide inside of the tubular member. The brace is connected by articulated joints to the overarm and to the saddle support. The method of connecting the brace to the overarm is more particularly shown in Figure 2 and comprises a connector 48 which is fastened to the overarm 21 by a T bolt 49 having a head 50 adjustably mounted in a T slot 51 formed in the side of the overarm. The connector has a rib 52 which fits into the T slot for guiding purposes as well as preventing turning of the connector. A stud 53 is driven into the connector 48 and passes through a bore 54 formed in the end of the rod 47.

This hole is lined with a rubber bushing 55 to prevent the transmission of vibration from the overarm to the brace and acts as a vibration dampening means. A nut 56 is threaded on the end of the stud and tightened against a shoulder thereon which is so located as to provide a slight clearance whereby the end of the rod is not held rigidly against lateral movement. The other end of the brace is connected by a similar articulated joint to a connector 57 which is shown in detail in Figure 6. This connector is adapted to be clamped to the saddle guideway 18 by a clamping member 58 and a clamping bolt 59.

The clamping member 57 is provided with a rectangular groove comprising a flat surface 60 and side surfaces 61 and 62 which are adapted to engage the top and two side surfaces of the guideway 18. The clamping member 58 engages the underside 63 of the guideway 18 and by drawing this member up by rotation of the clamping bolt 59 the connector 57 is rigidly clamped downward to the guide surface 18.

It will now be evident that by loosening the clamping bolts 59 and 49 located at opposite ends of the brace that the overarm may be longitudinally adjusted in accordance with the position of the table and the brace may be adjusted relative to the saddle support along the guideway 18 by whatever amount is permitted by the position of the saddle to position the brace very close to the end plane of the table and thereby hold to a minimum the cantilever length of the overarm. After both braces have been laterally adjusted or positioned, a clamping screw 64, shown more particularly in Figure 3 and threaded in the tubular member 46 and passing through a clamping piece 65, is tightened to clamp the rod 47 of the brace to the tubular member 46 to prevent relative movement between them.

There has thus been provided an improved arbor support and harness structure which may be laterally adjusted to minimize the unsupported length of the arbor and which will efficiently brace the same during cutting.

That which is claimed is:

1. In a milling machine having a support and an overarm slidably mounted on said support, of means for bracing said overarm including a pair of brace members, means connecting said brace members to opposite sides respectively of the overarm, additional means for connecting the opposite ends of said braces to said support, and vibration dampening means carried by said brace members for preventing the transmission of vibrations from the overarm to said base.

2. In a milling machine having a main support, and an overarm carried by said support, the combination of means for laterally bracing said overarm including a pair of braces each comprising telescoping members, T slots formed in opposite sides of the overarm, means in the T slots for clamping one end of the braces to opposite sides of the overarm, additional means for clamping the other end of the braces to the support, and means to clamp the telescoping members of each brace together after the ends of the braces have been clamped.

3. In a milling machine having a spindle, a spindle support, a work support, a saddle upon which the work support is mounted for adjustment parallel to the axis of the spindle, and a saddle support having guideways for the saddle, the combination with a cutter arbor adapted to be driven by said spindle, of means for supporting said arbor including an overarm adjustably mounted on the spindle support for movement parallel to said arbor, means to clamp the overarm to the spindle support, a pendant adjustably mounted on the overarm and having means for journaling the arbor, a pair of telescoping braces, articulated joints for attaching one end of said braces to said overarm, additional articulated joints for connecting the other end of said braces to the saddle support guideways, and means for clamping the respective pairs of telescoping members against relative axial movement after the other clamping means have been tightened.

4. In a milling machine having a spindle, a spindle support, a work support, a saddle on which the work support is mounted for adjustment parallel to the axis of the spindle and a saddle support having guideways for the saddle, the combination with a cutter arbor adapted to be driven by said spindle, of means for supporting said arbor including an overarm adjustably mounted on the spindle support for adjustment parallel to said arbor, means to clamp the overarm to the spindle support, a pendant adjustably mounted on the overarm and having means for journaling the arbor, a pair of telescoping braces, said overarm having T-slots extending longitudinally on opposite sides thereof, articulated joints mounted in said T-slots for attaching one end of said braces to said overarm, additional articulated joints for connecting the other end of said braces to the saddle support guideways, and means for clamping the respective pairs of telescoping members against relative axial movement after the other clamping means have been tightened.

5. In a milling machine having a spindle, a spindle support, a work support, a saddle upon which the work support is mounted for adjustment parallel to the axis of the spindle, and a saddle support having guideways for the saddle, the combination with a cutter arbor adapted to be driven by said spindle, of means for supporting said arbor including an overarm adjustably mounted on the spindle support for movement parallel to said arbor, means to clamp the overarm to the spindle support, a pendant adjustably mounted on the overarm and having means for journaling the arbor, a pair of telescoping braces, articulated joints for attaching one end of said braces to said overarm, additional articulated joints for connecting the other end of said braces to the saddle support guideways, means for clamping the respective pairs of telescoping members against relative axial movement after the other clamping means have been tightened, and vibration dampening means on all of said articulated joints for preventing the transmittal of vibration between the overarm and the saddle support.

6. In a milling machine having a spindle, a spindle support, a work support, a saddle on which the work support is mounted for adjustment parallel to the axis of the spindle and a saddle support having guideways for the saddle, the combination with a cutter arbor adapted to be driven by said spindle, of means for supporting said arbor including an overarm adjustably mounted on the spindle support for adjustment parallel to said arbor, means to clamp the overarm to the spindle support, a pendant adjustably mounted on the overarm and having means for journaling the arbor, a pair of telescoping braces, said overarm having T-slots extending longitudinally on opposite sides thereof, articulated joints mounted in said T-slots for attaching one end of said braces to said overarm, additional articulated joints for connecting the other end of said braces to the saddle support guideways, means for clamping the respective pairs of telescoping members against relative axial movement after the other clamping means have been tightened, and vibration dampening means on all of said articulated joints for preventing the transmittal of vibration between the overarm and the saddle support.

7. In a milling machine having a support and an overarm slidably mounted on said support, of means for bracing said overarm including a pair of brace members, means attached on opposite ends of said brace members to the overarm and to the support respectively, and vibration dampening means incorporated in each of said brace members.

LOUIS H. BLOOD.